April 24, 1951  G. E. FLINN  2,550,055
TRANSMISSION
Filed July 2, 1945
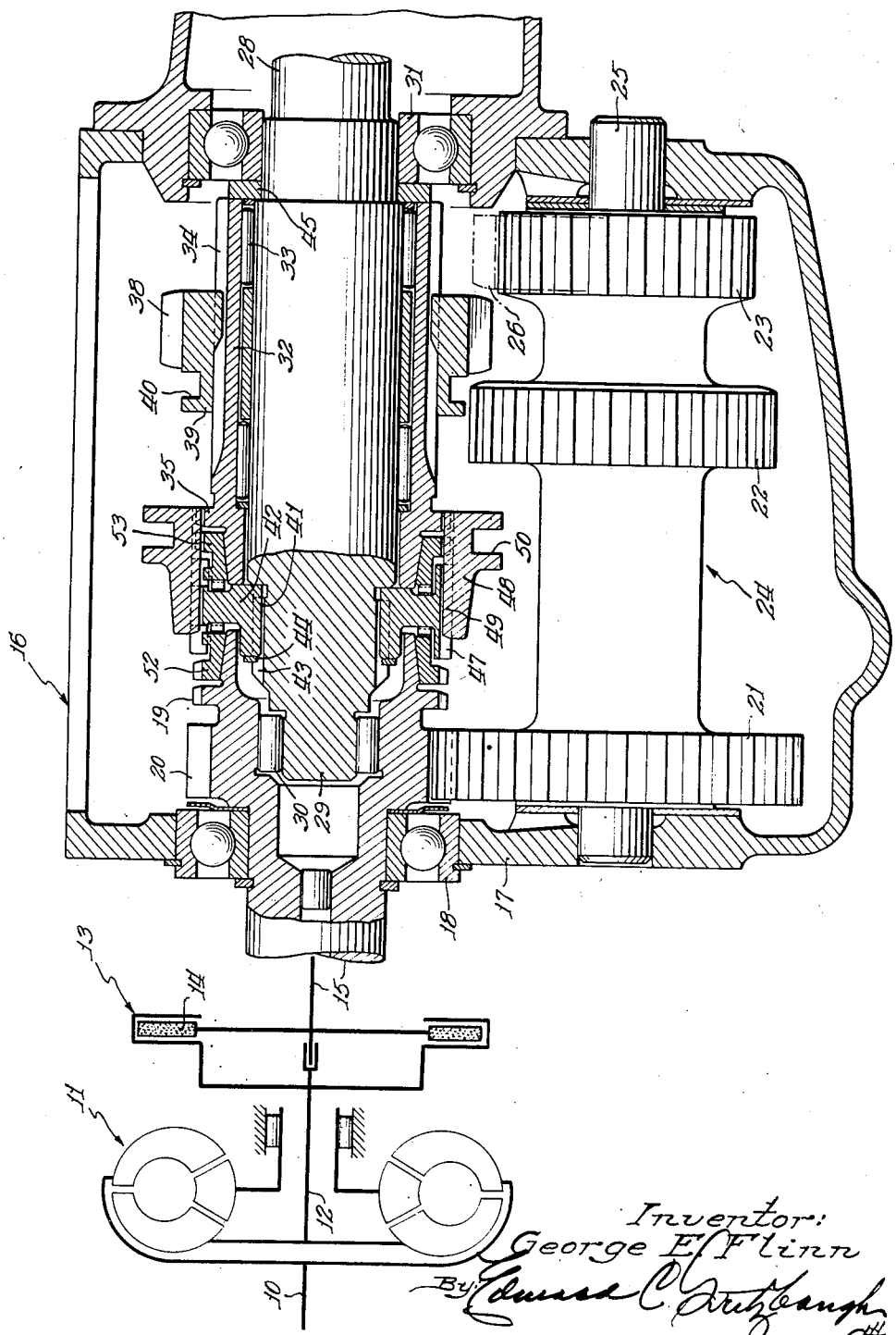
Inventor:
George E. Flinn
By Edward C. Gritzbaugh
Atty.

Patented Apr. 24, 1951

2,550,055

UNITED STATES PATENT OFFICE 2,550,055

TRANSMISSION

George E. Flinn, Muncie, Ind., assignor to Borg-Warner Corporation, Chicago, Ill., a corporation of Illinois Application July 2, 1945, Serial No. 602,697

12 Claims. (Cl. 74—333)

My invention relates generally to transmissions and more particularly to transmissions for automotive vehicles.

Although mechanically geared transmissions affording two forward speeds and a reverse speed have long been employed in various types of automotive vehicles, they have been found to be particularly useful in conjunction with hydrodynamic torque converting devices to provide, by such combination, greater flexibility of speed range than is afforded by the employment of a torque converter alone. For purposes of illustration, therefore, my transmission has been shown in the accompanying drawing as being employed with a hydrodynamic torque converter.

It is one object of my invention to provide an improved transmission affording two speeds forward and a reverse speed in which there is manually controlled shifting to select between forward or reverse drives and in each of which drives there is always a two-way driving connection between the input shaft of the transmission and the output shaft.

It is a further object to provide a transmission of the above-mentioned type which may be adapted to include an automatically controlled shift between low and high forward speeds.

It is a more particular object to provide in my transmission, which has an input shaft, an output shaft and a countershaft, an intermediate shaft rotatable on one of said first two shafts and selectively engageable with forward or reverse gear means on the countershaft. Such construction affords a further advantage, namely, simplicity and economy of construction through eliminating any necessity for free wheeling mechanism, lockup mechanism therefor, or a split countershaft.

Other objects and advantages will become apparent from the following written description of a preferred embodiment of my invention taken in conjunction with the accompanying drawing which shows a central, longitudinal, sectional view of my transmission. Portions of the transmission are shown in elevation and the transmission as a whole is diagrammatically represented as being connected through a friction clutch with a hydrodynamic torque converter.

Referring now to the drawing, a shaft 10, such as a crank shaft from an engine (not shown), is connected to a hydrodynamic torque converter indicated generally at 11. Drive from the torque converter is transmitted by means of an intermediate shaft 12 to a friction clutch which is indicated generally at 13. The driven disc 14 of the friction clutch 13 is connected to drive the input shaft 15 of my transmission which is indicated generally at 16. The shaft 15 is mounted for rotation in the transmission housing 17 by means of bearings 18. External clutch teeth 19 and gear 20 are formed on the flanged end of shaft 15, the gear 20 being engaged with a gear 21 for driving the same. Gears 21, 22 and 23 form a gear cluster 24 rotatably mounted on a countershaft 25 which is supported at each end in the transmission housing 17. Gear 23 is drivingly connected at all times with an idler gear 26 (indicated in dotted lines) which rotates on its own shaft (not shown) which, in turn, is supported by the housing 17.

Output shaft 28 has a reduced end 29 which is piloted as at 30 in the flanged end of input shaft 15. The other end of shaft 28 is mounted for rotation in bearings 31 which are carried by a portion of the transmission housing 17. An intermediate shaft or sleeve 32 is rotatably mounted upon the output shaft 28 on bearings 33. As viewed in the drawing, the right hand portion of sleeve 32 is splined as at 34 while the left hand portion has external clutch teeth 35. An internally splined gear 38 is secured on the splined end of sleeve 32 for rotation therewith. A hub 39 integrally formed on the gear 38 has a channel 40 which is engageable by a shift lever or fork to shift the gear 38 axially along the splined portion 34 of sleeve 32 into engagement either with gear 22 on countershaft 25 or with idler gear 26.

Adjacent the toothed end of sleeve 32 there is a hub member 42 having internal teeth 41 engaged with external teeth 43 on a reduced portion of output shaft 28. A snap ring 44 and a washer 45 prevent axial movement of hub member 42 and sleeve 32 along the output shaft 28. External teeth 47 on the hub member 42 drivingly support a clutch collar 48 which has internal teeth 49. The clutch collar 48 is axially shiftable in either direction by a yoke (not shown) or similar means positioned in a channel 50, formed in the periphery of the collar, to mesh the internal teeth 49 of said collar either with the external teeth 35 on sleeve 32 or with external teeth 19 on the flanged end of input shaft 15. It is contemplated that said clutch collar will be engaged either with sleeve 32 or with shaft 15 but will never be left in a neutral position. Synchronizer rings 52 and 53 are provided between the clutch collar 48 and teeth 35 and 19 to block engagement of teeth 49 of said clutch collar with either of said sets of teeth until the speed of rotation of the clutch collar and the teeth to be engaged are substantially synchronized.

Although clutch collar 48 is shiftable manually, it will be apparent that it is adaptable for automatically controlled shifting. Gear 38, on the other hand, is manually operable from a neutral position, shown in the drawing, to an engaged position either with gear 22 for forward drive or with idler gear 26 for reverse drive.

The operation of my transmission will now be set forth. Driving torque will in all speed ratios be supplied from a source of power such as an engine (not shown) to shaft 10 whence it will pass to the torque converter 11 and from there to intermediate shaft 12 which is connected to the friction clutch 13. When the friction clutch 13 is engaged, the driven disc 14 will transmit the power to shaft 15 to which it is drivingly secured. Assuming for purposes of description that gear 38 is in a neutral position, as shown in the drawings, and that the vehicle is motionless, clutch collar 48 will be engaged with teeth 35 on sleeve 32. When shaft 15 is rotating at idling speed and the operator of the vehicle desires to travel in a forward direction, friction clutch 13 is momentarily disengaged to permit easy engagement of gear 38 with gear 22 rotatably mounted on countershaft 25. Disengagement of friction clutch 13 permits input shaft 15 and gear cluster 24 to slow down by reason of the latter's connection through gear 21 with gear 20 on the input shaft 15. Having engaged gear 38 with gear 22, the operator will permit reengagement of friction clutch 13 and will then increase the speed of the engine (not shown) in the usual manner, whereupon the vehicle will move forwardly in low speed through the following power train: shaft 10 to torque converter 11, shaft 12, friction clutch 13, input shaft 15 and gear 20 formed integrally thereon, gears 21 and 22 of the gear cluster 24, gear 38, sleeve 32, teeth 35, clutch collar 48, hub member 42 to the output shaft 28 which is connected with the load.

Although my transmission may be adapted for automatically shifting clutch collar 48 from engagement with teeth 35 into engagement with teeth 19 on the input shaft 15, it is manually shiftable by any suitable means such as a shift yoke engaged in channel 50 of the clutch collar. During such shifting operation, synchronizer ring 52 acts to synchronize the speed of rotation of the clutch collar 48 with that of input shaft 15 and to block engagement of the internal teeth 49 of the collar with the teeth 19 on shaft 15 until the speeds of rotation are synchronized. Following the shifting operation, the vehicle will move forwardly at a higher speed since the input shaft 15 will be directly clutched to the output shaft 28 through the clutch collar 48 and hub member 42. In this forward speed, power flows from shaft 10 to torque converter 11, to shaft 12, friction clutch 13, input shaft 15, clutch teeth 19, clutch collar 48, hub 42 to output shaft 28 and thence to the load. During this time gear 38, which is splined to the sleeve 32, will continue to be engaged with gear 22 which is rotatably mounted on countershaft 25. As a result, sleeve 32 will continue to be driven, but at a slower speed than shaft 28, by reason of the following gear train: gear 20 on input shaft 15 to gear 21 on countershaft 25, gear 22, gear 38 to sleeve 32. There will no longer be a driving connection between sleeve 32 and output shaft 28, however, by reason of the clutch collar's having been shifted into engagement with clutch teeth 19 on the input shaft.

When it is desired to reestablish low forward speed again, clutch collar 48 will be disengaged from teeth 19 and, after its internal teeth 49 pass the synchronizer ring 53, will become engaged again with teeth 35 on the sleeve 32. Since gear 38 on sleeve 32 is always engaged with gear 22 when the vehicle is conditioned for forward drive, this downshift will immediately result in the low speed ratio being established again. The output shaft 28 will then be driven as first indicated above through a gear train and sleeve 32.

As pointed out earlier, clutch collar 48 is never left in a neutral position, whether manually or automatically controlled, and is always engaged with teeth 35 on the sleeve 32 when the vehicle is motionless or is moving forwardly in low speed. Since it is necessary for the vehicle to be substantially motionless before the reverse gear train may be established, clutch collar 48 will drivingly connect sleeve 32 to output shaft 28 when the operator is ready to shift gear 38 from a neutral position, or from engagement with gear 22, into engagement with idler gear 26. During this shifting operation, friction clutch 13 will be disengaged to permit easy meshing of gears 38 and 26. Following such shift, clutch 13 will again be engaged and reverse drive will be provided through the following power train: shaft 10 to torque converter 11, shaft 12, friction clutch 13, input shaft 15 and gear 20 formed integrally thereon, gears 21 and 23 on countershaft 25, idler gear 26, gear 38, sleeve 32, clutch teeth 35, clutch collar 48, hub member 42 to output shaft 28 and thence to the load.

From the foregoing description it will be seen that I have provided an efficient and compact power transmitting means of simple construction in which the operator is initially required to make a selection merely between forward and reverse drives. Having made such selection a positive two-way driving connection between the input shaft and the output shaft is provided at all times.

Although my transmission is illustrated in connection with hydrodynamic power transmitting means, it is to be understood that it may be employed independently thereof or in other combinations. It is to be further understood that my invention is not limited to the specific constructions and arrangements shown and described, except insofar as the claims are so limited, since it would be apparent to those skilled in the art that changes may be made without departing from the principles of my invention.

I claim:

1. In a transmission, in combination, an input shaft, an output shaft, an intermediate shaft, a countershaft, a plurality of driving means on said countershaft and driven from said input shaft, driving means secured about said intermediate shaft and shiftable thereon selectively to engage one of the said plurality of driving means, and clutch means adapted selectively to drivingly connect said output shaft to said intermediate shaft or to said input shaft.

2. In a transmission, an input shaft, an output shaft, a sleeve rotatable on the output shaft, a countershaft, a plurality of gear means on said countershaft and driven from said input shaft, driving means secured about said sleeve and shiftable thereon to engage one of the gear means, and clutch means adapted selectively to drivingly connect said output shaft to said sleeve or to said input shaft.

3. In a transmission, in combination, an input shaft, an output shaft, a sleeve rotatable on the output shaft, a plurality of gears driven from said input shaft, a gear secured about said sleeve and axially shiftable thereon selectively to engage one of the said plurality of gears, and clutch means adapted selectively to connect said output shaft to said sleeve or to said input shaft.

4. In a transmission, in combination, an input shaft, an output shaft, a sleeve rotatable on said output shaft, clutch means mounted for rotation with said output shaft and adapted selectively to engage said shaft with said sleeve or with said input shaft, a first gear train adapted to provide a low speed forward drive and a second gear train adapted to provide a reverse drive, said gear trains both being driven from said input shaft, and means mounted for rotation with said sleeve and shiftable thereon selectively to establish said low speed forward gear train or said reverse gear train.

5. In a transmission, in combination, an input shaft, an output shaft, a sleeve rotatable on said output shaft and a hub mounted on said output shaft for rotation therewith, a clutch collar mounted for rotation with said hub and axially shiftable thereon selectively to engage toothed members on said input shaft or toothed members on said sleeve, a plurality of driving means drivingly connectible between said input shaft and said sleeve, and driving means secured about said sleeve and shiftable thereon selectively to engage one of said first-mentioned driving means.

6. In a transmission, in combination, an input shaft, an output shaft, a sleeve rotatable on said output shaft, clutch means mounted for rotation with said output shaft and selectively engageable with clutch means on said input shaft or clutch means on said sleeve, speed synchronizing means between the clutch means on the output shaft and the respective clutch means on said sleeve and said input shaft, a plurality of gear trains drivingly connectible between said input shaft and said sleeve, and a gear secured about said sleeve and shiftable thereon selectively to engage said sleeve with one of said gear trains.

7. In a transmission, in combination, an input shaft, an output shaft, a sleeve rotatably mounted on said output shaft, a countershaft, a gear secured to said input shaft and drivingly connected with a first gear on said countershaft, a gear mounted on said sleeve for rotation therewith and axially movable thereon, second and third gears on said countershaft and rotatable with said first gear, said gear on said sleeve selectively being engageable directly with said second gear and engageable with said third gear through an idler gear, a hub mounted on said output shaft for rotation therewith, a clutch collar mounted for rotation with said hub and axially shiftable thereon selectively to engage toothed members on said input shaft or toothed members on said sleeve.

8. In a transmission, in combination, an input shaft, an output shaft, a sleeve rotatable on said output shaft, a countershaft, a plurality of gear means on said countershaft and drivingly connectible between said input shaft and said sleeve, driving means secured about said sleeve and shiftable thereon to engage one of the said plurality of gear means, clutch means adapted selectively to connect said output shaft to said sleeve or to the input shaft, and synchronizing means operable during shifting of said clutch means to synchronize the speed of said sleeve or said input shaft with the speed of said output shaft prior to permitting said clutch means to clutch said sleeve or input shaft, respectively, to said output shaft.

9. In a transmission, in combination, an input shaft, an output shaft, an intermediate shaft, a plurality of gears driven from said input shaft, a gear secured about said intermediate shaft and axially shiftable thereon selectively to engage one of the said plurality of gears, and clutch means adapted selectively to connect said output shaft to said intermediate shaft or to said input shaft.

10. In a transmission, in combination, an input shaft, an output shaft, an intermediate shaft rotatable relative to said shafts, clutch means mounted for rotation with said output shaft and selectively engageable with clutch means on said input shaft or clutch means on said intermediate shaft, speed synchronizing means between the clutch means on the output shaft and the respective clutch means on said intermediate shaft and said input shaft, a plurality of gear trains drivingly connectible between said input shaft and said intermediate shaft, and a gear secured about said intermediate shaft and shiftable thereon selectively to engage said intermediate shaft with one of said gear trains.

11. In a transmission, in combination, an input shaft, an output shaft, a sleeve rotatable on one of said shafts, a plurality of gears driven from the other of said shafts, a gear secured about said sleeve and axially shiftable thereon selectively to engage one of said plurality of gears, and clutch means adapted selectively to connect said one shaft to said sleeve or to said other shaft.

12. In a transmission, in combination, an input shaft, an output shaft, an intermediate shaft rotatable relative to said shafts, clutch means mounted for rotation with one of said shafts and selectively engageable with clutch means on the other shafts, a plurality of gear trains drivingly connectible between said intermediate shaft and one of said other shafts, and a gear secured about said intermediate shaft and shiftable thereon selectively to engage said intermediate shaft with one or the other of said gear trains.

GEORGE E. FLINN.

REFERENCES CITED

The following references are of record in the file of this patent:

UNITED STATES PATENTS

| Number | Name | Date |
|---|---|---|
| 1,877,736 | Wagner | Sept. 13, 1932 |
| 1,931,755 | Drexler | Oct. 24, 1933 |
| 2,054,222 | Lapsley | Sept. 15, 1936 |
| 2,199,095 | Banker | Apr. 30, 1940 |
| 2,285,760 | Thompson | June 9, 1942 |
| 2,327,063 | Randol | Aug. 17, 1943 |
| 2,328,104 | Simpson | Aug. 31, 1943 |